(12) United States Patent
Thomson et al.

(10) Patent No.: US 7,347,101 B2
(45) Date of Patent: Mar. 25, 2008

(54) MEASURING STRAIN IN A STRUCTURE USING A SENSOR HAVING AN ELECTROMAGNETIC RESONATOR

(75) Inventors: Douglas John Thomson, Winnipeg (CA); Gregory E. Bridges, Winnipeg (CA)

(73) Assignee: University of Manitoba, Winnipeg (CA)

( * ) Notice: Subject to any disclaimer, the term of this patent is extended or adjusted under 35 U.S.C. 154(b) by 0 days.

(21) Appl. No.: 10/517,769

(22) PCT Filed: Jun. 26, 2003

(86) PCT No.: PCT/CA03/00952

§ 371 (c)(1),
(2), (4) Date: Dec. 27, 2004

(87) PCT Pub. No.: WO2004/003500

PCT Pub. Date: Jan. 8, 2004

(65) Prior Publication Data

US 2005/0241403 A1    Nov. 3, 2005

Related U.S. Application Data

(60) Provisional application No. 60/392,260, filed on Jul. 1, 2002.

(51) Int. Cl.
*G01B 7/16* (2006.01)
*G01L 1/00* (2006.01)
(52) U.S. Cl. ...................................................... 73/773
(58) Field of Classification Search ................. 73/773
See application file for complete search history.

(56) References Cited

U.S. PATENT DOCUMENTS 3,715,686 A * 2/1973 Perlman ..................... 331/96
3,909,713 A    9/1975 Billeter
(Continued)

FOREIGN PATENT DOCUMENTS

DE    2007447    9/1970
(Continued)

OTHER PUBLICATIONS

"Deployment of a fiber Bragg grating-based measurement system in a structural health monitoring application", M. D. Todd, G. A. Johnson and S. T. Vohra, Naval Research Laboratory, Code 5673, Washington, DC 20375, USA, Smart Mater, Struct. 10 (2001) 534-539.
(Continued)

*Primary Examiner*—Michael Cygan
*Assistant Examiner*—Octavia Davis
(74) *Attorney, Agent, or Firm*—Bereskin & Parr

(57) ABSTRACT

The system (10) comprises a sensor (18) 90×90×90×30 mm as an electromagnetic microwave cavity (20) with a coupler (22) with a wire (40) and an antenna (42). Cavity (20) produces a response signal (26) in response to an interrogation signal (24) from interrogator (16). Sensor (18) is coupled to a structure (14) to allow a strain to alter the resonance properties. 3.6 GHz is used with a detection of a 2.5 kHz change. If not temperature via strain is detected a mechanical amplifier is used with cavity (20) for temperature compensation. Continuous or intermittent narrowband signals are used as interrogation signals (24). Used with bridges for structural health monitoring. Also for aircrafts, dams, buildings, vehicles.

31 Claims, 5 Drawing Sheets

U.S. PATENT DOCUMENTS

| | | | |
|---|---|---|---|
| 3,927,369 A * | 12/1975 | Billeter et al. | 324/642 |
| 4,196,398 A * | 4/1980 | Kuhn | 331/9 |
| 4,604,898 A * | 8/1986 | Gohin et al. | 73/701 |
| 4,651,571 A | 3/1987 | McGlade | |
| 4,843,346 A | 6/1989 | Heymann et al. | |
| 4,897,541 A * | 1/1990 | Phillips | 250/227.21 |
| 5,101,103 A * | 3/1992 | Johnson et al. | 250/251 |
| 5,119,034 A * | 6/1992 | Ishikawa et al. | 324/633 |
| 5,173,640 A * | 12/1992 | Geisler et al. | 315/111.21 |
| 5,181,423 A | 1/1993 | Philipps et al. | |
| 5,227,798 A | 7/1993 | Hildebrand | |
| 5,261,278 A * | 11/1993 | Kain | 73/514.24 |
| 5,433,115 A | 7/1995 | Spillman, Jr. et al. | |
| 5,440,300 A * | 8/1995 | Spillman, Jr. | 340/10.34 |
| 5,703,576 A | 12/1997 | Spillman, Jr. et al. | |
| 5,764,161 A | 6/1998 | Schier | |
| 5,821,425 A | 10/1998 | Mariani et al. | |
| 5,867,258 A * | 2/1999 | Frederick et al. | 356/35.5 |
| 5,969,260 A * | 10/1999 | Belk et al. | 73/773 |
| 6,025,725 A * | 2/2000 | Gershenfeld et al. | 324/652 |
| 6,354,152 B1* | 3/2002 | Herlik | 73/597 |
| 6,359,444 B1* | 3/2002 | Grimes | 324/633 |
| 6,980,688 B2* | 12/2005 | Wilk | 382/152 |
| 7,034,660 B2* | 4/2006 | Watters et al. | 340/10.41 |
| 7,086,593 B2* | 8/2006 | Woodard et al. | 235/449 |
| 2005/0252300 A1* | 11/2005 | Miller | 73/715 |

FOREIGN PATENT DOCUMENTS

| | | |
|---|---|---|
| FR | 2700846 | 7/1994 |
| GB | 2212273 | 7/1989 |
| JP | 60203828 | 10/1985 |
| JP | 05264474 | 10/1993 |

OTHER PUBLICATIONS

"Conceptual framework of a remote wireless health monitoring system for large civil structures", Darryll J. Pines and Philip A. Lovell, Department of Aerospace Engineering, University of Maryland, College Park, MD, USA in Smart Mater, Struct. 7 (1998) 627-636.

W. R. Fowkes, "Cavity Resonator Measurements at 90 Ghz", ARDB Technical Note 164, pp. 1-6.

McGray-Hill Encyclopedia of Science & Technology, "An international reference work in twenty volumes including an index", 9th Edition, pp. 453-455 and 585-587.

William H. Hayt, Jr., "Engineering Electromagnetics", Fifth Edition, McGraw-Hill, Inc., pp. 416-427.

John d. Kraus, "Electromagnetics", Fourth Edition, McGraw-Hill, Inc., pp. 698-705.

David H. Staelin, et al., "Electromagnetic Waves", Prentice Hall, Upper Saddle River, New Jersey 07458, pp. 336-349, 372-381, 390-401.

http://www.fnrf.science.cmu.ac.th/theory/waveguide/Waveguide%20theory%2014.html.

http://www.tpub.com/neets/book11/44h/htm.

"Tunable laser demodulation of various fiber Bragg grating sensing modalities", R. M. Measures, M. M. Ohn. S. Y. Huang, J. Bigue and N. Y. Fan, Smart Mater. Struct. 7 No. 2 (Apr. 1998) 237-247.

"Structural monitoring by curvature analysis using interfermetric fiber optic sensors", D. Inaudi, S. Vurpillot, N. Casanova and P. Kronenberg, Smart Mater, Struct. 7 No. 2, (Apr. 1998) 199-208.

"Structural health monitoring of innovative bridges in Canada with fiber optic sensors", R. C. Tennyson, A. A. Mufti, S. Rizkalla, G. Tadros and B. Benmokrane, Smart Mater. Struct. 10 No. 3 (Jun. 2001) 560-573.

* cited by examiner

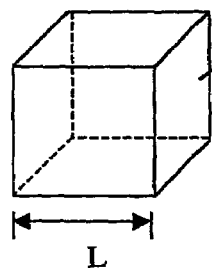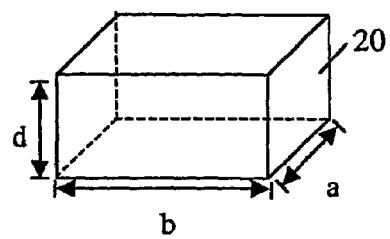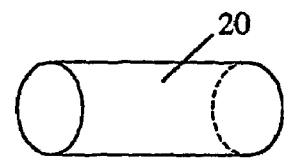
Figure 3a  Figure 3b  Figure 3c
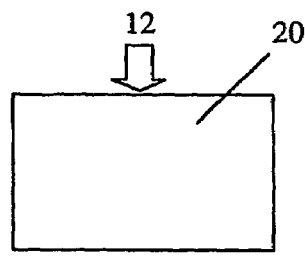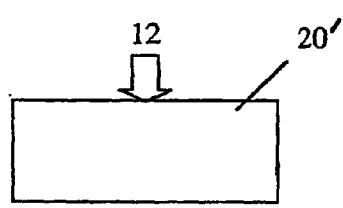
Figure 4a  Figure 4b
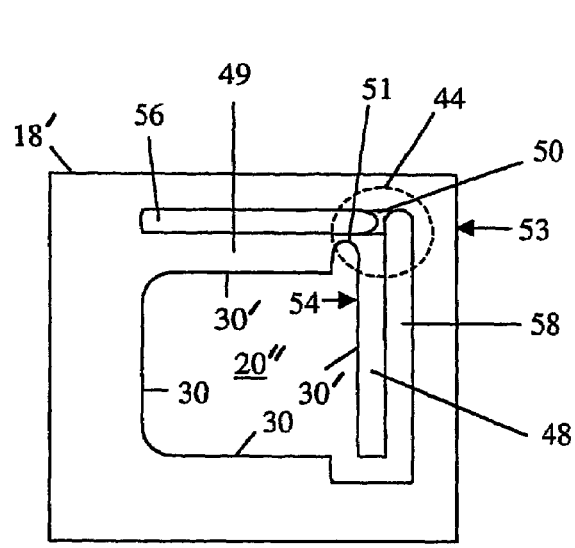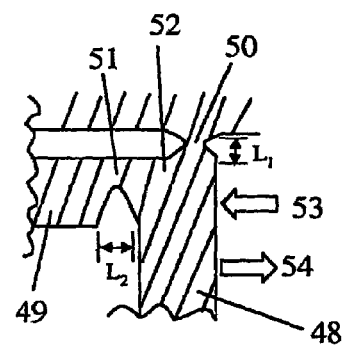
Figure 5b
Figure 5a
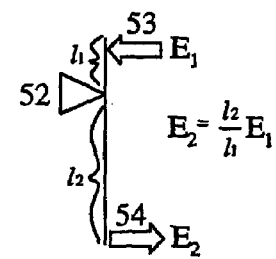
Figure 5c

MEASURING STRAIN IN A STRUCTURE USING A SENSOR HAVING AN ELECTROMAGNETIC RESONATOR

FIELD OF THE INVENTION

The present invention is related to a system and method for measuring strain that is experienced by structures. More particularly, the present invention is directed towards a wireless sensor system and method for measuring strain in structures based on electromagnetic resonance.

BACKGROUND OF THE INVENTION

In the 1930's the U.S. and Canadian governments began public work programs to develop a transportation infrastructure comprising roadways and bridges. The increased weight and numbers of today's trucks compared with design loads that were used for the roads and bridges at the time of construction, combined with aging, environmental conditions and the use of corrosive salts has resulted in deterioration and increasing structural deficiencies. Currently, the U.S. has 542,000 bridges that consume billions of dollars each year in construction, rehabilitation and maintenance. In Canada, there are an estimated 10,000 railroad bridges and 30,000 automobile bridges with 40% of these bridges requiring repair or replacement. A similar situation is said to exist in Europe and Asia. It can be appreciated that other structures, such as, for example, but not limited to, aircrafts, dams and buildings can also suffer from similar structural degradation.

In light of these problems, significant research has been directed over the last few years towards the field of structural health monitoring in order to mitigate potential hazards to the general public. The research has been directed towards improved methodologies in detecting and monitoring structural degradation with an eye towards improving service life and minimizing down time for maintenance. Ongoing monitoring may be used on these structures to control and predict maintenance and replacement costs and also to increase the lifetime and reliability of these structures. For example, structural information gathered on bridges is important in determining whether or not load ratings should be changed, to catch faults early enough so that repairs may be done, or to find structural problems that require the bridge to be replaced.

The current movement towards structural monitoring involves a detection suite of distributed smart sensors which can detect potential construction flaws or structural fatigue to expose a potential hazard to the public. Structures having these sensors are referred to as smart structures. Embedded smart structure technology (actuators and sensors) offers the unique ability to assess structures on demand to determine the current condition of the structure. These sensors may also be designed to monitor specific conditions. For example, these devices can provide event-based information such as the condition of structural integrity after a sudden impact from an earthquake, or continuous measurement of data for a range of strain and damage conditions.

Two main groups of prior art sensors have been developed for use in smart structures. The first group of prior art sensors comprise sensors that require hardwiring and include traditional strain gauges and fiber-optic strain gauges. The traditional strain gauges are made of metal foil and are bonded to the structure. The strain is determined by measuring the resistance of the metal foil or by determining the mechanical resonant frequency of the metal foil. The foil gauges require a physical connection to transmit the information regarding the structural strain as well as a DC signal for providing power for the strain gauge. Fiber-optic strain gauges were developed to address some of the problems associated with traditional strain gauges. Fiber optic strain gauges are embedded into the structure but require a fiber-optic connection to make a measurement. One technique for measuring structural strain uses the center reflectivity wavelength of the optical fiber Bragg gratings. Systems based on both traditional strain gauges and fiber-optic strain gauges result in a series of connected sensors throughout the structure.

Both traditional strain gauges and fiber-optic strain gauges require a link to the outside world. Accordingly, when these sensors are installed in a structure, provisions for this link, such as wires, must be provided. Over time these wires can corrode and compromise the integrity of the monitoring system. In addition, fiber-optic units can be difficult to install and can be subject to temperature drift. Furthermore, when the connections linking these sensor systems break then the monitoring system will not function.

The second group of prior art sensors comprise passive sensors that do not require a physical connection. Passive sensors include acoustic sensors and sensors that employ passive circuits for detecting strain.

SUMMARY OF THE INVENTION

The present invention is directed towards a sensor system and method for measuring strain experienced by a structure. The sensors of the sensor system would be installed into a structure such as a bridge, building or the like, to detect the strain experienced by the structure. Several sensors can be strategically placed at various locations of the structure that are susceptible to forces. The sensors do not require a source of power and could be activated on demand by a remote interrogator which could be brought within relative proximity to each sensor to activate and record measurements from each sensor individually.

Each sensor has an electromagnetic resonator such as, for example, an electromagnetic cavity having a resonant frequency that is related to the dimensions of the cavity. The dimensions of the cavity are dependant upon the strain experienced by the structure. Accordingly, strain experienced by the structure would be represented by changes in the resonant frequency of the sensor. The interrogator utilizes an interrogation signal having a frequency content that matches the resonant frequency of the electromagnetic cavity. Upon excitation by the interrogation signal, the electromagnetic cavity would produce a response signal that is related to the resonant frequency of the cavity. The interrogator would process the response signal to determine the strain that is experienced by the structure.

Accordingly, in a first aspect, the invention is directed towards a system for measuring strain experienced by a structure. The system comprises a sensor with a body having an electromagnetic resonator. The electromagnetic resonator produces a response signal in response to an interrogation signal. The body is coupled to the structure to allow the strain to alter the resonance properties of the electromagnetic resonator thereby altering the response signal. The sensor further includes a coupler that is coupled to the body. The coupler transfers the interrogation signal into the electromagnetic resonator and transfers the response signal out of the electromagnetic resonator. The system further includes an interrogator that generates and transmits the interrogation signal to the sensor. The interrogator also receives the response signal.

In another aspect, the present invention provides a sensor for measuring strain experienced by a structure. The sensor comprises a body having an electromagnetic resonator. The electromagnetic resonator produces a response signal in response to an interrogation signal. The body is coupled to the structure to allow the strain to alter the resonance properties of the electromagnetic resonator thereby altering the response signal. The sensor also includes a coupler that is coupled to the body. The coupler transfers the interrogation signal into the electromagnetic resonator and transfers the response signal out of the electromagnetic resonator.

In a further aspect, the present invention provides a method for measuring strain experienced by a structure. The method comprises:

a) coupling a sensor having an electromagnetic resonator to the structure;

b) providing an interrogation signal to the electromagnetic resonator to evoke a response signal; and, c) receiving the response signal.

BRIEF DESCRIPTION OF THE DRAWINGS

For a better understanding of the present invention and to show more clearly how it may be carried into effect, reference will now be made, by way of example only, to the accompanying drawings which show a preferred embodiment of the present invention and in which:

FIGS. 3a, 3b and 3c are front views of various embodiments of the electromagnetic cavity;

FIG. 4a is a block diagram of an electromagnetic cavity before being affected by a strain;

FIG. 4b is a block diagram of an electromagnetic cavity while being affected by a strain;

FIG. 5a is a front view of an alternative embodiment of the sensor having a mechanical amplifier;

FIG. 5b is a magnified view of the mechanical amplifier;

FIG. 5c is a block diagram illustrating how the amplifier acts like a lever;

DETAILED DESCRIPTION OF THE INVENTION

Figure 1:
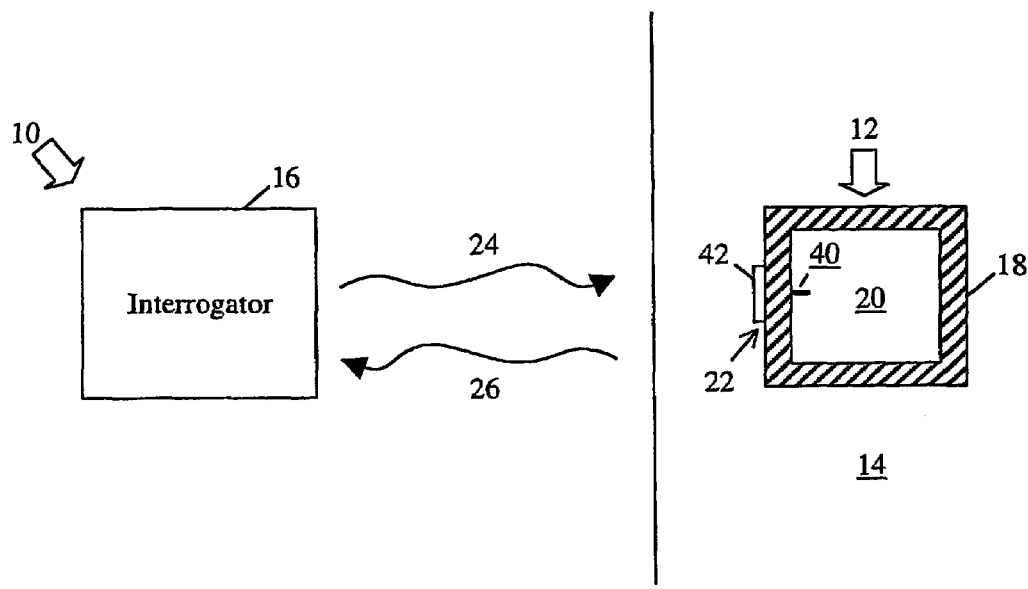
FIG. 1 is a partial, cross-sectional front view of a sensor system comprising an interrogator and a sensor having an electromagnetic cavity for measuring the strain that is experienced by a structure in accordance with the present invention.

Referring now to FIG. 1, shown therein is a partial cross-sectional front view of a sensor system 10 for determining strain 12 experienced by a structure 14. The sensor system 10 comprises an interrogator 16 and a plurality of sensors 18. The structure 14 could be for example, but not limited to, a bridge, a road, an overpass, a building, an aircraft or the like and the strain 12 may result from for example, but not limited to, force, temperature, or the like. The integrity of the structure 14 could be monitored at any given time to indicate when repair or replacement is necessary for the structure 14. To achieve this, several sensors 18 would be strategically placed at various locations of the structure 14 that are susceptible to strain (these locations are known to those skilled in the art). For simplicity of illustration and explanation only one sensor 18 and only a partial view of the structure 14 is shown in FIG. 1. The sensors 18 do not require a source of power and could be activated on demand by a remote interrogator 16 as described further below. The interrogator 16 would be brought within relative proximity of each sensor 18 to activate and record measurements from each sensor 18 individually.

The sensor 18 has a body that defines an electromagnetic resonator. For the embodiment illustrated in FIG. 1, the sensor 18 has a body comprising side walls that, define an electromagnetic cavity 20 therein. The sensor 18 also includes a coupler 22. The interrogator 16 provides an interrogation signal 24 that is coupled to the electromagnetic cavity 20 via the coupler 22. In response, the electromagnetic cavity 20 produces a response signal 26 that is radiated via the coupler 22. The interrogation signal 24 may be at least partially absorbed by the electromagnetic cavity 20 if the interrogation signal 24 has a frequency content that matches the resonant frequency of the electromagnetic cavity 20. In this case, there will not be much energy at the resonant frequency of the electromagnetic cavity 20 that is reflected by the electromagnetic cavity 20 while the interrogation signal 24 is being transmitted. Accordingly, the response signal 26 will have a small signal component at the resonant frequency of the electromagnetic cavity 20. Alternatively, the interrogation signal 24 may not have a frequency content that matches the resonant frequency of the electromagnetic cavity 20. In this case, most of the interrogation signal 24 will be reflected by the electromagnetic cavity 20 and the response signal 26 will comprise most of the interrogation signal 24. In this fashion, it is possible to determine the resonant frequency of the electromagnetic cavity 20. This is important since the resonant frequency of the electromagnetic cavity 20 will vary depending on the dimensions of the electromagnetic cavity 20 which in turn depends on the strain 12 experienced by the structure 14. Hence, the change in the resonant frequency of the electromagnetic cavity 20 provides an indication of the strain 12 experienced by the structure 14.

Figure 2A:
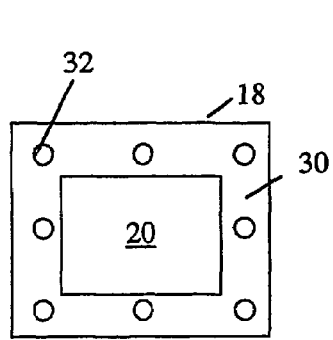
FIG. 2a is a front view of the sensor with a plate removed.

Referring now to FIG. 2a, shown therein is a front view of an embodiment of the sensor 18 with the electromagnetic cavity 20. The sensor 18 has side walls 30 that encircle the electromagnetic cavity 20, and a plurality of apertures 32 situated on the side walls 30. The electromagnetic cavity 20 may also contain a suitable dielectric if so desired.

The sensor 18 may preferably be made of a non-corrosive metal so that the sensor 18 remains functional for the lifetime of the structure 14. For example, the sensor 18 may be made from steel. The sensor 18 is a relatively small object so that it does not compromise the structural integrity of the structure 14 when the sensor 18 is coupled with the structure 14. For example, the sensor 18 may be a rectangular, hollow metal block having dimensions of 90 mm×90 mm×30 mm.

Figure 2B:
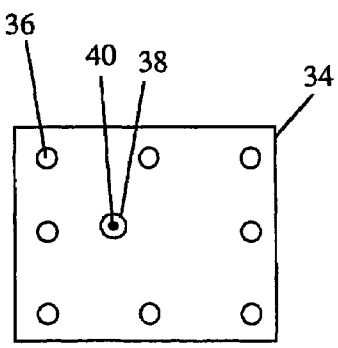
FIG. 2b is a rear view of the plate of the sensor.

Referring now to FIG. 2b, shown therein is a rear view of a plate 34 which forms one of the side walls of the electromagnetic cavity 20. The plate 34 has a plurality of apertures 36 which are aligned with the apertures 32 so that the plate 34 may be secured to the side walls 30 via suitable fasteners such as for example, but not limited to, pins, screws, nuts and bolts. Alternatively, pressure fitted fins could be placed on the plate 34 and the side walls 30 so that the plate 34 can be secured to the side walls 30 by compression fitting. The plate 34 also has an aperture 38 to allow a conductive wire 40 to protrude within the electromagnetic cavity 20 when the plate 34 is fastened to the ridge 30. The wire 40 forms part of the coupler 22 which will be discussed further below.

Figure 2C:
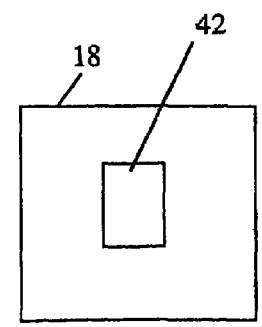
FIG. 2c is a front view of the plate secured to the sensor.

Referring now to FIG. 2c, shown therein is a front view of the sensor 18 as it would be appear in use with the plate 34 attached to the side walls 30. There is an antenna 42 on the front of the plate 34 which forms part of the coupler 22. The sensor 18 is constructed to have a tight seal to prevent any debris from entering the electromagnetic cavity 20 which may compromise the resonance properties of the electromagnetic cavity 20 or damage the wire 40.

The side walls 30, plate 34 and the bottom wall (not shown) of the sensor 18 define the boundaries of the electromagnetic cavity 20. The side walls 30, plate 34 and bottom of the sensor 18 are preferably rigid to maintain the structural integrity of the sensor 18, but at the same time these surfaces are also reasonably flexible to allow the volume of the electromagnetic cavity 20 to change in response to the strain 12 experienced in the structure 14.

The electromagnetic cavity 20 is enclosed by conducting walls that are capable of containing oscillating electromagnetic fields that produce standing waves. Accordingly, when electromagnetic energy is transferred to the electromagnetic cavity 20, the electromagnetic energy will oscillate between the conductive walls transforming between an electric field and a magnetic field and become more intensified in a resonating fashion depending on the frequency of the transferred electromagnetic energy. Accordingly, the electromagnetic cavity 20 possesses resonant properties within narrow frequency bands centered about discrete frequencies called resonances or resonant frequencies. Resonance will occur when the frequency of the transferred electromagnetic energy has a frequency content that matches the resonant frequency of the electromagnetic cavity 20.

Any completely enclosed conductive surface, regardless of its shape, can act as an electromagnetic cavity resonator. This allows a cavity resonator to be built for different applications and have a resonant frequency in different frequency ranges. Accordingly, the electromagnetic cavity 20 may also have a variety of shapes such as cubic (FIG. 3a), rectangular (FIG. 3b) and cylindrical (FIG. 3c). Other shapes may also be useful. The choice of a particular shape for the electromagnetic cavity 20 may depend on the direction upon which the strain 12 is to be measured as well as the frequency range of operation.

Referring now to FIG. 3a, an example of an electromagnetic cavity 20 for use with the sensor 18 is illustrated. For the illustrated embodiment, the electromagnetic cavity 20 resembles a section of a square waveguide that is closed at both ends by conducting plates. The frequency at which resonance occurs, for a particular mode, is the frequency of the electromagnetic field at which nulls occur at the walls of the electromagnetic cavity 20. Therefore, the physical size of the electromagnetic cavity 20 affects the resonant frequency. In general, the smaller the electromagnetic cavity, the higher the resonant frequency. However, another controlling factor of the resonant frequency is the shape of the electromagnetic cavity 20 and the mode of the electromagnetic fields that exist within the electromagnetic cavity 20.

The resonant frequency of the electromagnetic cavity 20 may be changed by changing the dimensions of the electromagnetic cavity 20 which is known as shape tuning. For instance, varying the distance L will result in a new resonant frequency because the inductance and the capacitance of the electromagnetic cavity 20 are changed by differing amounts. If the dimensions of the electromagnetic cavity 20 are decreased, the resonant frequency will increase. This will occur when there is a change in the strain 12 within the structure 14. This is shown in FIGS. 4a and 4b, where an increase in the strain 12 (FIG. 4a) on a portion of the body of the sensor 18 surrounding the electromagnetic cavity 20 results in a decrease in the dimensions of the electromagnetic cavity 20' (FIG. 4b). Alternatively, the resonant frequency will decrease if the dimensions of the electromagnetic cavity 20 increases. This will occur when there is a strain that is pulling on the body of the sensor 18 surrounding the electromagnetic cavity 20.

For a rectangular electromagnetic cavity, such as the one shown in FIG. 3b having dimensions in the x, y and z direction represented by the parameters a, b and d, the electromagnetic cavity 20 can support $TE_{mnp}$ and $TM_{mnp}$ modes, where TE stands for transverse electric wave, TM stands for transverse magnetic wave and m, n, and p are integers indicating the mode of the enclosed fields. Both the $TE_{mnp}$ and $TM_{mnp}$ modes resonate at the frequency $f_{mnp}$ given by:

$$f_{mnp} = \frac{c}{2}\sqrt{\left(\frac{m}{a}\right)^2 + \left(\frac{n}{b}\right)^2 + \left(\frac{p}{d}\right)^2} \quad (1)$$

where c is the speed of light ($3\times10^8$ m/sec).

Assuming that no TE or TM modes are excited in the z direction (i.e. p=0) and only the first mode is excited in the x and y directions (i.e. m=n=1) then the resonant frequency ($f_r$) is given by equation 2.

$$f_r = \frac{c}{2}\sqrt{\left(\frac{1}{a}\right)^2 + \left(\frac{1}{b}\right)^2} \quad (2)$$

Now letting a=b=h and assuming a change in the y direction of Δh, the resonant frequency is given by equation 3.

$$f_r = \frac{c}{2}\sqrt{\left(\frac{1}{h}\right)^2 + \left(\frac{1}{\Delta h + h}\right)^2} \qquad (3)$$

Furthermore, if Δh<<h, the resonant frequency is closely approximated by equation 4.

$$f_r = \frac{c}{\sqrt{2}\, h}\sqrt{1 - \frac{\Delta h}{2h}} \qquad (4)$$

The resonant frequency ($f_u$) with no strain is:

$$f_u = \frac{c}{\sqrt{2}\, h} \qquad (5)$$

The resonant frequency ($f_s$) that occurs due to strain is:

$$f_s = f_u\left(1 - \frac{1}{\sqrt{2}}E\right) \qquad (6)$$

where E=Δh/h is defined as strain. Accordingly, the strain E, can be calculated from the resonant frequencies $f_u$ and $f_s$ according to:

$$E = \frac{\sqrt{2}\,(f_u - f_s)}{f_u} \qquad (7)$$

The strained resonant frequency $f_s$ can be larger or smaller than the unstrained resonant frequency $f_u$. This depends if the strain 12 is positive or negative.

By selecting a high frequency range for the interrogation signal, the sensor system 10 is able to make precise measurements of small amounts of strain. For instance, given values of $f_u$=3.6 GHz and $f_s$=3.599995 GHz, i.e., a change in resonant frequency of 2.5 KHz, the strain would be:

$$E = \frac{\sqrt{2}\,(3.6 - 3.5999975)}{3.6} \approx 1 \text{ microstrain} \qquad (8)$$

Therefore, operating at 3.6 GHz, results in a shift in resonance of 2.5 KHz for every change in strain of 1 microstrain. Accordingly, the sensor system 10 will be able to make precise measurements of small amounts of strain, even in parts per million.

A strain of 0.1%, for example, would result in a frequency change of 2.5 MHz. Accordingly, to measure such a strain, the sensor system 10 would need a bandwidth of at least 2.5 MHz. Since the regulatory commissions would dictate the frequency that could be used for the sensor system 10, some possible frequency ranges that may be used would be centered at 900 MHz, 2.5 GHz and 5.8 GHz. The frequency range at 2.5 GHz may be used since it would have a bandwidth from 2.4 to 2.6 GHz (200 MHz) which is more than adequate for sensing the 0.1% strain mentioned above.

As mentioned previously, the coupler 22 transfers or injects the interrogation signal 24 into the electromagnetic cavity 20 and the coupler 22 also transfers or radiates the response signal 26 to the interrogator 16. Energy can be inserted or removed from an electromagnetic cavity 20 by the same methods that are used to couple energy into and out of waveguides. The operating principles of probes (electric coupling), loops (magnetic coupling), and slots are the same whether used in an electromagnetic cavity or a waveguide as is commonly known in the art. Therefore, any one of these three methods may be used to transfer energy into or out of the electromagnetic cavity 20. If a slot were used for the coupler 22, the degree of coupling would be determined by the size, shape and position of the slot.

The coupler 22 preferably comprises the antenna 42 coupled to the wire 40. The antenna 42 allows the coupler 22 to receive the interrogation signal 24 and transmit the response signal 26 while the wire 40 injects the interrogation signal 24 into the electromagnetic cavity 20 and transmits the response signal 26 to the antenna 42 for transmission. The antenna 42 should be preferably matched to the unstrained resonant frequency of the electromagnetic cavity 20 so that there is efficient coupling for the frequency components of the interrogation signal 24 that match the resonant frequency of the electromagnetic cavity 20. A variety of types of antennas may be used for the antenna 42 such as a patch antenna or a loop antenna.

The wire 40 acts as a probe and the interrogation signal 24 generates a current flow in the probe to set up an electric field within the electromagnetic cavity 20. For efficient coupling, the wire 40 should be placed at the location of maximum electric field intensity within the electromagnetic cavity 20 which depends on the mode of the electromagnetic field contained in the electromagnetic cavity 20. The amount of energy that is coupled to the electromagnetic cavity 20 may be reduced by decreasing the length of the wire 40, by moving the wire 40 away from the location of the maximum electric field intensity, or by shielding the wire 40. Furthermore, the size and shape of the wire 40 determines the frequency, bandwidth and power-handling capability of the wire 40. For instance as the diameter of the wire 40 increases, the bandwidth and power-handling capability of the wire 40 both increase. The greater power-handling capability is directly related to the increased surface area of the wire 40. Removal of energy from the electromagnetic cavity 20 is a reversal of the injection process using the same type of wire 40.

In an alternative embodiment, there may be two couplers connected with the sensor 18. The first coupler may be used to inject electromagnetic energy into the electromagnetic cavity 20 and the second coupler may be used to transmit electromagnetic energy from the electromagnetic cavity 20.

An alternative method of transferring or injecting energy into the electromagnetic cavity 20 is by setting up a magnetic field in the electromagnetic cavity 20. This can be accomplished by incorporating a small loop at the end of the wire 40 which carries current into the electromagnetic cavity 20. A magnetic field builds up around the loop and expands to fill the electromagnetic cavity 20. If the frequency of the current in the loop is within the resonant bandwidth of the electromagnetic cavity 20 then energy will be transferred to the electromagnetic cavity 20. For efficient coupling to the electromagnetic cavity 20, the loop should be placed at a location of maximum magnetic field intensity which depends on the mode of the electromagnetic field contained in the electromagnetic cavity 20. When less efficient coupling is desired, the loop may be moved or rotated so that the loop encircles a smaller number of magnetic field lines within the electromagnetic cavity 20. Furthermore, when the diameter of the loop is increased, the bandwidth and power-handling capabilities of the loop also increase. Removal of energy from the electromagnetic cavity 20 is a reversal of the injection process using the same loop and wire 40.

The electromagnetic cavity 20 has advantageous properties when it is designed to have a resonant frequency in the RF range. With a resonant frequency in the RF range it should be possible to measure strains on the order of 1 µE. Furthermore, a resonant frequency in the RF range allows for a more compact design of the electromagnetic cavity 20. In addition, with an electromagnetic cavity 20, different resonant frequencies result in the excitation of different modes of the electromagnetic field within the electromagnetic cavity 20 which can make the sensor 18 sensitive to strains in different directions.

Another advantageous property of an electromagnetic cavity is a high Q factor. The Q factor is a measure of the resonant frequency relative to the resonance bandwidth:

$$Q = \frac{f_o}{\Delta f} \quad (9)$$

where $f_o$ is the resonant frequency and $\Delta f$ is the resonance bandwidth. The Q factor of an electromagnetic cavity also represents the amount of stored energy compared with the energy lost due to the imperfectly conducting walls, the imperfect dielectric within the electromagnetic cavity (if present) and the coupling to the outside world, as represented by equations 10 and 11.

$$Q = \frac{2\pi f_o \cdot (\text{energy stored})}{\text{average power loss}} \quad (10)$$

$$Q = \frac{\pi \cdot (\text{energy stored})}{\text{energy loss per half cycle}} \quad (11)$$

In general, electromagnetic cavities may be designed to have a Q factor in excess of 1,000. A high Q factor allows for an accurate determination of the resonant frequency of the electromagnetic cavity 20. In addition, larger values for the Q factor are associated with higher-quality resonances and smaller losses.

The Q factor of the electromagnetic cavity 20 also determines the rate at which the response signal 26 decays when the interrogation signal 24 is removed or turned off. The intensity of the electric field will decay when excitation is removed from the electromagnetic cavity 20 as given in equation 12:

$$E(t) = E_o \cdot e^{-(\pi f_o / Q)t} \quad (12)$$

where $E_o$ is the initial value of the electric field intensity when the excitation (i.e. the interrogation signal 24) is removed and $E(t)$ is the time dependent value of the electric field intensity.

Referring now to FIG. 5a, shown therein is an alternative embodiment of the sensor 18' having an electromagnetic cavity 20" which is coupled to a mechanical amplifier 44 which is shown in more detail in FIG. 5b (please note that FIGS. 5a and 5b are not drawn to scale). The mechanical amplifier 44 amplifies the effect of the strain 12 on the electromagnetic cavity 20". The mechanical amplifier 44 also allows the electromagnetic cavity 20" to be temperature insensitive. The embodiment of the mechanical amplifier 44 shown in FIG. 5a is but one type of mechanical amplifier. Other types of mechanical amplifiers comprising various arrangements of flexures could also be used.

The mechanical amplifier 44 comprises a first member 48 and a second member 49 coupled to the first member 48. The first member 48 has a first region 50 with a first length $L_1$. The second member 49 has a second region 51 with a second length $L_2$ which is larger than the first length $L_1$. The first region 50 is coupled to the second region 51 by a fulcrum region 52. If a strain 53, having a magnitude $E_1$, is acting to the right of the sensor 18 in the left direction, the first region 50 is exposed to the strain 53 and transfers the strain 53 to the second region 51 which experiences a strain 54 having a magnitude $E_2$. The second region 51 forms a portion of the body surrounding the electromagnetic cavity 20" and accordingly transfers the strain 54 thereto. However, due to the different lengths of the first and second regions 50 and 51, the magnitude of the strain 53 is amplified by an amplification factor A according to equation 13.

$$A = \frac{L_2}{L_1} \quad (13)$$

Accordingly, the regions 50, 51 and 52 act like a lever as shown in FIG. 5c. The effect of any changes in the magnitude of the strain 53 on the sensor 18' will be magnified which will produce a larger change in the dimensions of the electromagnetic cavity 20". This in turn will produce a larger change in the resonant frequency of the electromagnetic cavity 20".

The sensor 18' further comprises slots 56 and 58 to provide an electrical short circuit for the electromagnetic cavity 20" to make it appear as if the electromagnetic cavity 20" is totally enclosed. This is not the case since the sensor 18' has the mechanical amplifier 44 which will move due to the strain 53. To further implement the electrical short circuit, the side walls 30' are slightly lower in height than side walls 30 to provide a small air gap underneath the plate 34 so that electromagnetic energy flows from the electromagnetic cavity 20" into the slot 56, travels over the first member 48, enters the slot 58 and returns to the electromagnetic cavity 20". The electrical length of the path just described is preferably half the wavelength of the resonant frequency of the electromagnetic cavity 20".

Thermal drift can be a problem with prior art sensors because the accuracy of the prior art sensors vary since measurements change with temperature fluctuations. This makes it difficult to compare measurements taken during the winter and summer months which in turn makes it difficult to know if the strain in a structure has changed during the winter months or if the variations in measurements are due to temperature. The mechanical amplifier 44 shown in FIGS. 5a and 5b will not amplify thermal drift because temperature variations will affect the length of the first and second members 48 and 49 by the same factor which cancels out in equation 13.

Figure 6A:
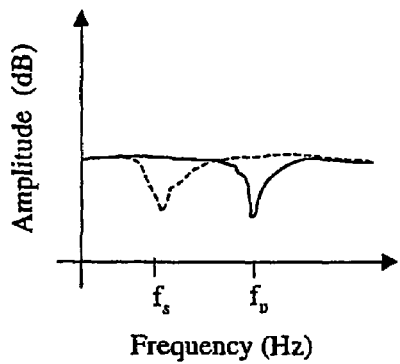
FIG. 6a is a plot of response signal amplitude versus frequency illustrating a first method of determining the resonant frequency of the electromagnetic cavity.

The resonant frequency of the electromagnetic cavities 20, 20' and 20", and hence changes in the strain 12 within the structure 14, can be determined in one of two ways. The first method of determining the resonant frequency involves the continuous presentation of the interrogation signal 24 during the determination of the resonant frequency. Referring to FIG. 6a, when the interrogation signal 24 has a frequency content that matches the resonant frequency of the electromagnetic cavity 20, during excitation by the interrogation signal 24, the electromagnetic cavity 20 absorbs this frequency content which will be absent in the response signal 26. Thus, while the interrogation signal 24 is exciting the electromagnetic cavity 20, all frequencies in the interrogation signal 24, other than those that match the resonant frequency of the electromagnetic cavity 20 will be reflected which is represented by a minimum at the frequency $f_u$ in FIG. 6a. When the sensor 18 experiences a change in the strain 12, the resonant frequency changes which is represented by the minimum at the frequency $f_s$ in FIG. 6a. Accordingly, the interrogator 16 may be built to detect a minimum in the response signal 26 which represents the resonant frequency of the electromagnetic cavity 20.

Figure 6B:
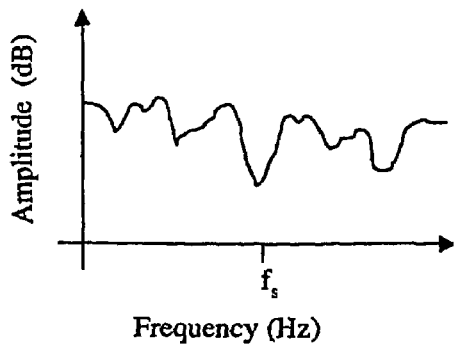
FIG. 6b is a plot of response signal amplitude versus frequency illustrating the interference that is present when the first method of determining the resonant frequency of the electromagnetic cavity is used.

However, while the interrogation signal 24 is being transmitted to the sensor 18, there are a lot of objects within the structure 14, such as steel reinforcements, which may reflect and/or absorb the transmitted energy. The result is the introduction of many valleys and peaks at different frequencies within the response signal 26 as shown in FIG. 6b. This makes it difficult to determine the resonant frequency of the electromagnetic cavity 20. In this case, some pre-processing of the response signal 26 may be necessary such as bandpass filtering to remove noise. Furthermore, a thresholding scheme could be used to detect the notch which corresponds to the resonant frequency.

The second method of determining the resonant frequency of the electromagnetic cavity 20 circumvents the problem due to interference from other objects in the structure 14 that was just discussed. After the interrogation signal 24 is turned off, the electromagnetic cavity 20 will continue to produce the response signal 26 for a period of time according to equation 12. However, now the response signal 26 contains energy at the resonant frequency of the electromagnetic cavity 20. The other objects in the structure 14 will also continue to reflect energy after the interrogation signal 24 has been turned off. However, because the electromagnetic cavity 20 has such a high Q factor, the reflections from the objects within the structure 14 will stop before the electromagnetic cavity 20 stops producing the response signal 26. For instance, given a Q factor of 1000, the response signal 26 may be radiated by the electromagnetic cavity 20 for 1000 cycles while the interfering reflections from the other objects in the structure 14 will be radiated for far fewer cycles. (1 cycle is the period related to the resonant frequency, i.e. 1 cycle=$1/f_r$).

Figure 7A:
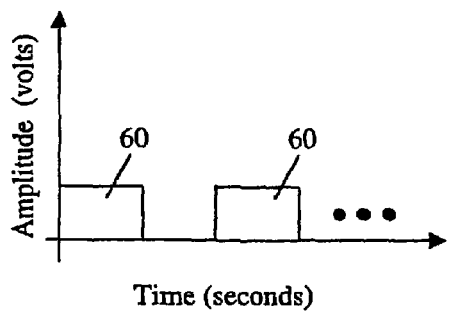
FIG. 7a is a plot of interrogation signal amplitude versus time illustrating the interrogation signal that is used for a second method of determining the resonant frequency of the electromagnetic cavity.
Figure 7B:
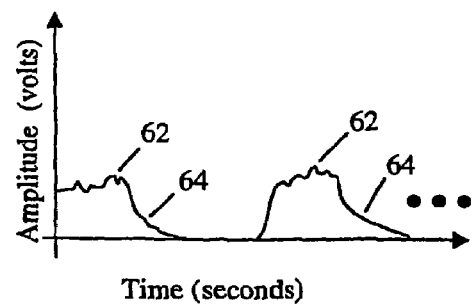
FIG. 7b is a plot of response signal amplitude versus time when the second method of determining the resonant frequency of the electromagnetic cavity is used.
Figure 7C:
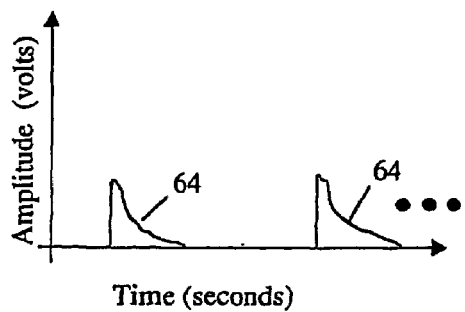
FIG. 7c is a plot of response signal amplitude versus time when gating is used to eliminate unwanted reflections.
Figure 7D:
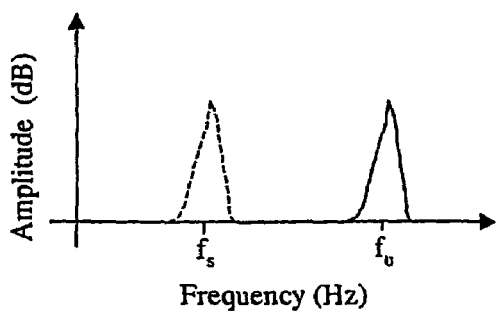
FIG. 7d is a plot of response signal amplitude versus frequency when the second method of determining the resonant frequency of the electromagnetic cavity is used.

Referring now to FIG. 7a, the interrogation signal 24 may be modulated or pulsed so that it is on for a period of time and then turned off. The interrogation signal 24 is shown here as pulses 60 to show the occasions when the interrogation signal 24 is on. In practice, the interrogation signal 24 may actually be a sinusoid or a broadband signal as discussed below. Referring now to FIG. 7b, an example of the response signal 26 is shown. The jagged portion 62 of the response signal 26 represents the portion of the response signal 26 that is reflected as well as the interference from the other objects in the structure 14 while the interrogation signal 24 is being transmitted. The exponentially decaying portion 64 of the response signal 26 predominantly represents the exponentially decaying energy that is produced by the electromagnetic cavity 20 when the interrogation signal 24 is turned off and the electromagnetic cavity 20 has been excited to resonate. Accordingly, after waiting for a brief period of time for the reflected interfering energy to subside, the interrogator 16 can sense the response signal 26 to detect a peak in the reflected energy which represents the resonant frequency of the electromagnetic cavity 20. This is represented in FIG. 7c which shows the employment of gating to remove the interfering reflections from the response signal 26. The detected resonant frequency would appear as shown in FIG. 7d with the unstrained resonant frequency represented by $f_u$ and the strained resonant frequency represented by $f_s$.

Figure 8A:
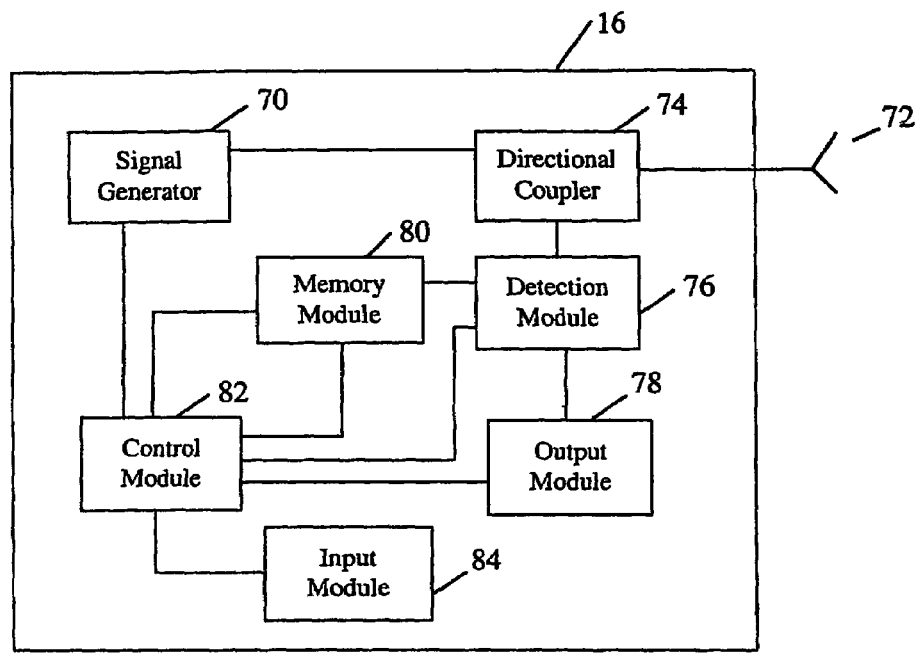
FIG. 8a is a block diagram of an embodiment of the interrogator.

Referring now to FIG. 8a, shown therein is an embodiment of the interrogator 16. The interrogator 16 comprises a signal generator 70 for generating the interrogation signal 24 and an antenna 72 for transmitting the interrogation signal 24 to the sensor 18 and for receiving the response signal 26 from the sensor 18. The signal generator 70 is coupled to the antenna 72 via a directional coupler 74. The interrogator 16 further comprises a detection module 76 that is coupled to the directional coupler 74. The detection module 76 analyzes the response signal 26 to detect the resonant frequency of the electromagnetic cavity 20. The interrogator 16 further comprises an output module 78 that is coupled to the detection module 76. The output module 78 provides an indication of any changes in the strain 12 that acts on the sensor 18.

The interrogator 16 also comprises a memory module 80 for storing previous values of the resonant frequency of each sensor 18 in the sensor system 10 and a control module 82 for controlling the operation of the interrogator 16. The memory module 80 is coupled to the signal generator 70, the detection module 76 and the control module 82. The control module 82 is connected to each module of the interrogator 16 and the signal generator 16. The control module 82 co-ordinates the operation and timing of each of the components of the interrogator 16. The control module 82 may be a microprocessor or a DSP. The interrogator 16 further comprises an input module 84 that is connected to the control module 82. The input module 84 is used to activate the interrogator 16 to interrogate one of the sensors 18. The input module 84 may also be used to alter the operational parameters of the interrogator 16 such as selecting which method is used to determine the resonant frequency of the sensor 18. The input module 84 may be a keypad or another suitable input device.

The signal generator 70 generates the interrogation signal 24 according to one of the two methods for determining the resonant frequency of the electromagnetic cavity that were discussed above. In either case, the signal generator 70 generates the interrogation signal 24 with the underlying purpose of exciting the electromagnetic cavity 20. Unfortunately, the resonant frequency of the electromagnetic cavity 20 is not known a priori since the strain 12 experienced by the sensor 18 is not known a priori. However, after taking a baseline measurement, perhaps upon first coupling the sensor 18 with the structure 14, an approximate value of the resonant frequency of the electromagnetic cavity 20 can be determined for a subsequent measurement. The baseline measurement may first comprise taking a series of measurements of the sensor 18 before coupling the sensor 18 with the structure 14 to get an average value for the unstrained resonant frequency. After the sensor 18 has been coupled with the structure 14, a series of measurements may then be taken to produce an average measurement of the strained resonant frequency. Averaging is used to prevent taking spurious readings. The value of the baseline resonant frequency can be stored in the memory module 82 for later retrieval. Accordingly, during the next measurement, the frequency content of the interrogation signal 24 may be varied about the baseline resonant frequency to determine the current resonant frequency. Once the current resonant frequency is determined, this value may also be stored in the memory module 82. In this fashion, during the measurement of a subsequent resonant frequency, the last measured resonant frequency can be retrieved from the memory module 82 and the interrogation signal 24 varied about this frequency. Accordingly, the memory module 82 records information related to past strains such as the magnitude of each strain and the associated resonant frequency of the electromagnetic cavity 20.

If the interrogation signal 24 is a narrowband signal, such as a sinusoidal signal, the signal generator 70 may sweep the center frequency of the interrogation signal 24 within a certain sweep range of the previously measured resonant frequency to determine the current resonant frequency of the electromagnetic cavity 20. To generate a sinusoidal interrogation signal, a variable frequency oscillation circuit such as a voltage controlled oscillator may be used for the signal generator 70. Alternatively, a crystal controlled oscillator that provides adequate frequency stability may also be used. For each frequency used to generate the sinusoidal signal, the magnitude of the response signal may be recorded by the detection module 76 to generate a plot such as that shown in FIG. 6a. The detection module 76 may then analyze this recorded data to determine the resonant frequency.

Alternatively, a broadband signal, such as a chirp signal, may be used for the interrogation signal 24. Such an interrogation signal 24 may be advantageous since the interrogation signal 24 would not have to be swept through the sweep range just mentioned. In this case, the interrogation signal 24 may have a center frequency that is equivalent to a previously measured resonant frequency. Furthermore, the interrogation signal 24 would have a bandwidth that is sufficient to detect the change in the resonant frequency of the electromagnetic cavity 20 under expected changes in the strain 12 experienced within the structure 14. In this case, the response signal 26 can be measured by the detection module 76 which may then perform frequency analysis on the response signal 26 to detect the resonant frequency as discussed further below.

As previously discussed, due to interference from reflections and absorption by other objects in the structure 14, a plot of the magnitude of the response signal 26 versus frequency will be contaminated by unwanted reflections as shown in FIG. 6b. Accordingly, it will be difficult to detect the resonant frequency of the electromagnetic cavity 20 in the presence of the interference. In this case, the signal generator 70 may be implemented to facilitate the second method of determining the resonant frequency of the electromagnetic cavity 20. The signal generator 70 could generate an interrogation signal 24 such as the narrowband or broadband signals that were previously described (if a narrowband signal is used for the interrogation signal 24 then frequency sweeping is required). The signal generator 70 would also have a modulator to modulate the interrogation signal 24 with a modulation signal to turn the interrogation signal 24 on and off as shown in FIG. 7a. The modulation signal may be a pulse train having an appropriate period and duty cycle such that the response signal 26 from the electromagnetic cavity 20 decays to a small level prior to the application of the next portion of the interrogation signal 24 (i.e. the next portion 60). Alternatively, a switch may be used to couple the signal generator 70 to the directional coupler 74. The switch could be open and closed, under the control of the control module 82, to produce an on/off interrogation signal 24 as shown in FIG. 7a.

The antenna 72 may be any antenna suitable for generating and receiving RF signals. For instance the antenna 72 may be a dipole antenna or a patch antenna. There may also be another embodiment of the interrogator 16 in which there are two antennas wherein the first antenna is used for transmitting the interrogation signal 24 and the second antenna is used to receive the response signal 26. In this case there would be no need for the directional coupler 74. The first antenna would be coupled to the signal generator 70 via some signal conditioning circuitry such as an amplifier and the second antenna would be coupled to the detection module 76 also via some signal conditioning circuitry to reduce the noise and interference in the response signal 26.

The directional coupler 74 is a commonly used passive component in RF devices which is used to transmit a signal in either the forward or backward direction. A bi-directional coupler transmits signals in both directions so that a signal may be transmitted while another signal is being received. The directional coupler 74 is preferably a bi-directional, four port coupler with the ports connected to the signal generator 70, the antenna 72 and the detection module 76. The remaining port would be left floating. When the interrogation signal 24 is sent to the antenna 72, half of the energy is sent to the antenna 72 and the other half of the energy is sent to the floating port. When the response signal 26 is received by the antenna 72, half of the energy is sent to the detection module 76 and the other half of the energy is sent to the signal generator 70.

The detection module 76 analyzes the response signal 26 to detect the resonant frequency of the electromagnetic cavity 20. The detection module 76 may be implemented in a number of ways depending on which method is used for the determination of the resonant frequency of the electromagnetic cavity 20. In all cases, the detection module 76 would pre-process the response signal 26 to reduce the amount of noise in the response signal 26 and to translate the frequency content of the response signal 26 to another frequency band for more efficient signal processing as is commonly known to those skilled in signal processing. For instance, the detection module 76 may include a bandpass filter for removing noise from the response signal 26 as well as a mixer to demodulate the response signal to an intermediate frequency or to the baseband for analysis. If the interrogator 16 is implemented using a digital signal processor or another embedded processor then downsampling may also be performed to reduce the amount of data that is recorded.

When the first method of determining the resonant frequency is used by the interrogator 16, and a narrowband signal is used for the interrogation signal, the detection module 76 may be an envelope detector that is used to detect the magnitude of the response signal 26. The envelope detector may be a diode detector or a peak detector as is commonly known to those skilled in the art. The magnitude of the response signal 26 is measured and indexed by the center frequency of the narrow band signal that was transmitted during the measurement of the response signal 26. The detection module 76 then determines which measurement is smaller than its neighboring measurements (i.e. to locate the minimum).

Alternatively, if a broadband signal is used for the interrogation signal 24, the detection module 76 may incorporate frequency analysis to analyze the measured response signal 26 across frequency to determine the resonant frequency. In this case, the detection module 76 may include a bank of correlators or a filterbank, which are each associated with a frequency, and locate which correlator or filter has the smallest output to determine the minimum. Alternatively, the detection module 76 may incorporate an FFT module (which may be implemented in hardware or software if a microprocessor or DSP is used to implement the interrogator 16) to perform a frequency analysis of the measured response signal 26. A thresholding algorithm may be used on the FFT of the measured response signal 26 to detect the minimum. Furthermore, the use of a broadband signal allows the same interrogation signal 24 to be repeatedly transmitted so that time averaging may be done on the resultant response signals 26. Time averaging would reduce the magnitude of the noise in the response signal 26 provided that the time lag for each response signal 26 is similar.

When the second method of determining the resonant frequency is used by the interrogator 16, and either a narrowband or a broadband signal is used for the interrogation signal 24, the detection module 76 incorporates a timer, or a gating device to delay the measurement of the response signal 26 until the interference from the other objects in the structure 14 has diminished (i.e. to measure the portion 64 of the response signal 26 as shown in FIG. 7c). If a narrowband signal is used for the interrogation signal 24, the detection module 76 may incorporate an envelope detector to detect when the response signal 26 is a maximum. There will only be significant response energy during the portion 64 of the response signal 26 when the frequency of the narrowband signal includes the resonant frequency of the electromagnetic cavity 20. Since this event would be detected before changing the center frequency of the narrowband signal to the next frequency in the sweep range, the resonant frequency would be the frequency that was last selected for the interrogation signal 24.

Alternatively, if a broadband signal is used for the interrogation signal 24, the detection module 76 may perform frequency analysis on the response signal 26 to determine the resonant frequency using any of the frequency analysis techniques previously discussed. However, in this case, a peak in the amplitude of the response signal versus frequency denotes the resonant frequency (i.e. see FIG. 7d). A thresholding method may be used to determine the peak in the FFT data. Furthermore, the use of a broadband signal allows the same interrogation signal 24 to be transmitted so that time averaging may be used on the response signal 26. Time averaging will reduce the magnitude of the noise in the response signal 26 provided that the time lag for the portion 64 of the response signals 26 are similar.

The output module 78 provides an indication of any changes in 25 the strain 12 that acts on the sensor 18. The output module 78 receives the detected resonant frequency from the detection module 76 and calculates the change in force according to equation 7 above. Accordingly, the output module 78 is further coupled to the memory module 80 to obtain a previous resonant frequency value which may be the baseline resonant frequency value to determine an absolute change in structural strain. Alternatively, the output module 78 may obtain the latest resonant frequency that was measured to monitor the ongoing change in structural strain across time. The output module 78 may further comprise an output device such as an LCD screen to show the calculated change in structural strain or to show the detected resonant frequency. Alternatively, the output device may also comprise a speaker with associated circuitry that generates an audible tone that is related to the degree of change in structural strain. In this fashion, an alarm may be sounded when the change in structural strain exceeds a certain criteria and structural failure is imminent. Alternatively, the output device may comprise a paper printout device that provides a hardcopy of the calculated information.

Figure 8B:
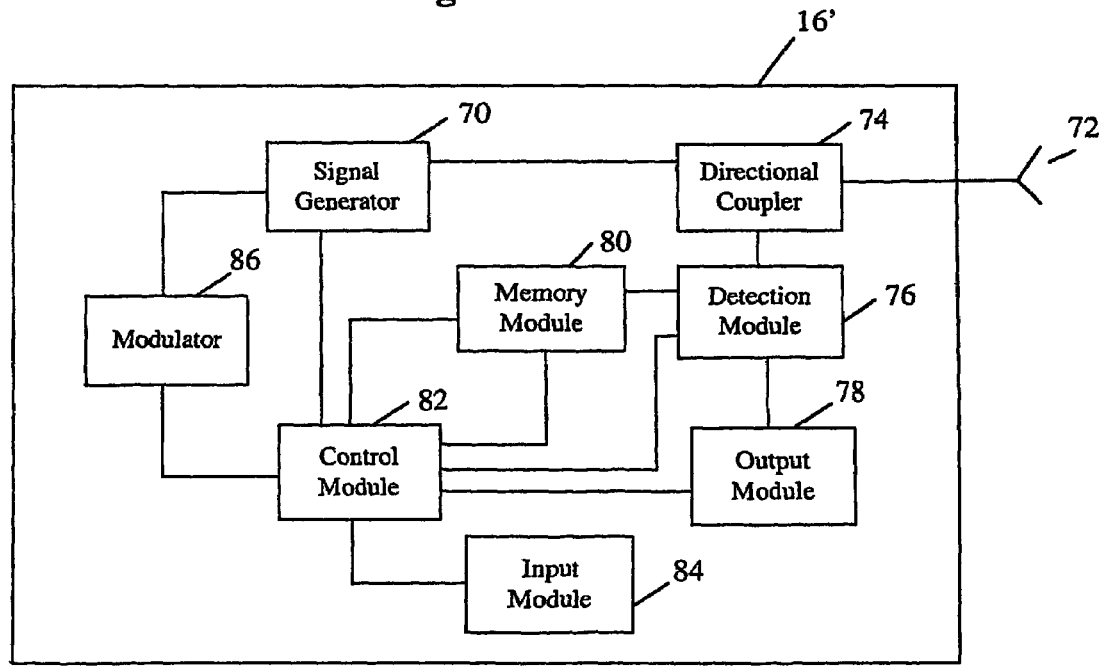
FIG. 8b is a block diagram of an alternate embodiment of the interrogator.

Alternatively, referring to FIG. 8b, another embodiment of the interrogator 16' comprises a modulator 86 that is in communication with the signal generator 70 and the control module 82. When the second method of determining the resonant frequency of the electromagnetic cavity 20 is used by the interrogator 16', the modulator 86 generates a modulating signal, which may be a pulse train as discussed above, that is then multiplexed with the signal that is generated by the signal generator 70 which may be a narrowband or broadband signal as discussed above. The remainder of the interrogator 16' operates in the same fashion as the interrogator 16 and will not be discussed.

Figure 9:
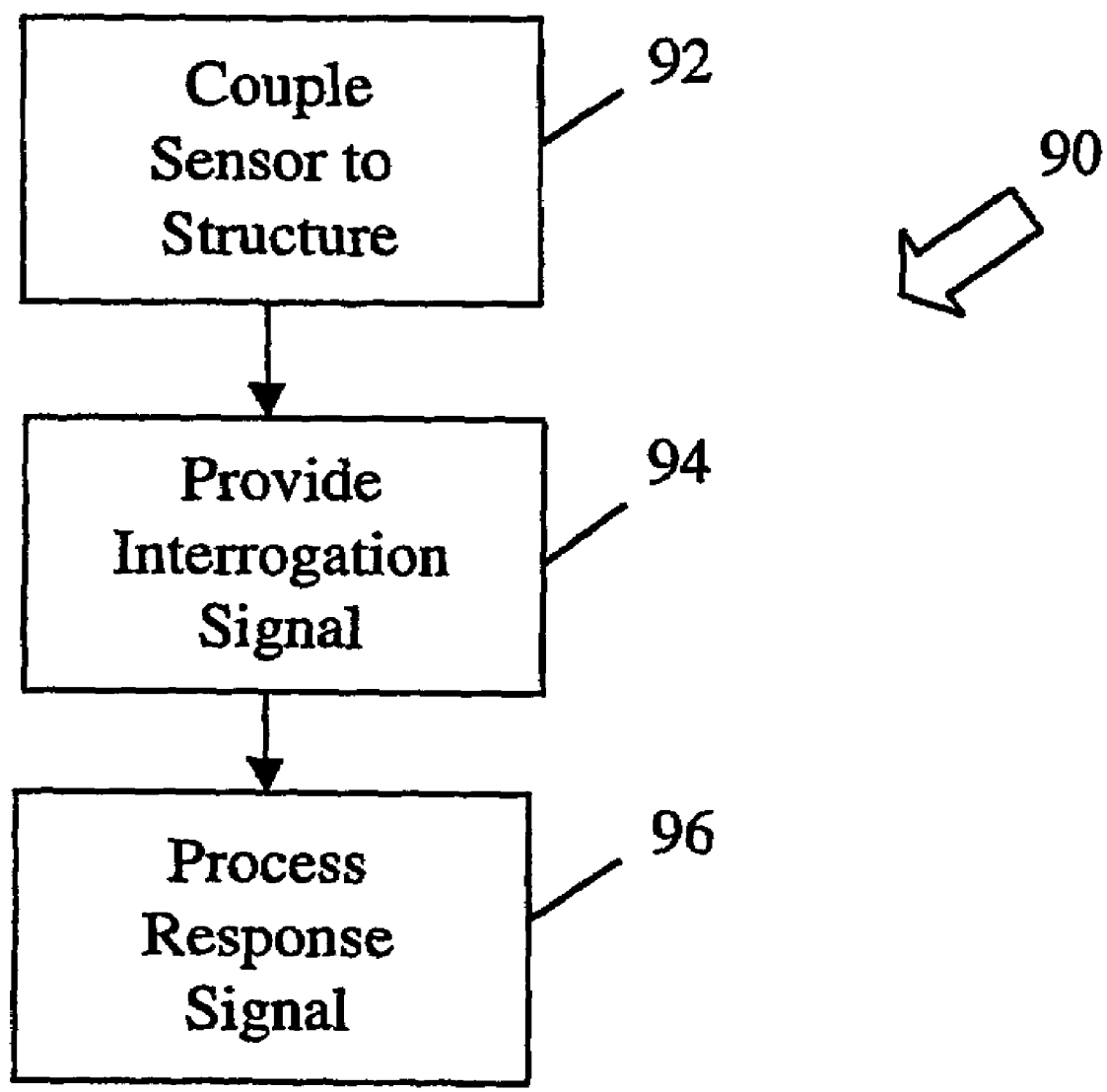
FIG. 9 is a flowchart of a method for sensing the force in a structure.

Referring now to FIG. 9, shown therein is a method 90 for measuring the change in the strain 12 in the structure 14. The method 90 starts at step 92 where the sensor 18 that houses the electromagnetic cavity 20 is coupled to the structure 14. Coupling may involve embedding the sensor 18 within the structure 14 or attaching the sensor 18 to the outside of the structure 14. The next step 94 is to provide the interrogation signal 24 to the sensor 18 to excite the electromagnetic cavity 20 and evoke the response signal 26. The response signal 26 is in turn related to the strain 12 experienced by the structure 14. The method 90 then moves to step 96 where the response signal 26 is processed to determine the resonant frequency of the electromagnetic cavity 20 and hence the strain 12 experienced by the structure 14.

The method 90 may further comprise the step of amplifying the strain 12 experienced by the structure 14 in a mechanical fashion to amplify the magnitude of the strain 12 on the electromagnetic cavity 20. This will allow the sensor 18 to sense smaller changes in strain 12.

Step 94 of the method 90 may involve providing the interrogation signal 24 as a narrowband signal and sweeping the center frequency of the narrowband signal in a sweep range while measuring the response signal 26. Processing the response signal 26 in step 96 would then comprise performing frequency analysis or a form of envelope detection (as described above) to determine a minimum in the response signal 26 at a frequency within the sweep range.

Alternatively, the method may comprise providing the interrogation signal 24 as a broadband signal with a center frequency equal to a previously measured resonant frequency while measuring the response signal 26. Processing the response signal 26 in step 96 would then comprise performing frequency analysis on the response signal 26 to detect a minimum that is related to the resonant frequency of the electromagnetic cavity 20.

Alternatively, step 92 of the method 90 may involve modulating the interrogation signal 24 to provide an intermittent interrogation signal 24. The response signal 26 would then be measured shortly after the interrogation signal 24 is off to allow for the interference from other objects contained in the structure 14 to decrease in amplitude. Processing the response signal 26 in step 96 would then comprise performing frequency analysis or a form of envelope detection (as described above) on the response signal 26 to detect a peak that is related to the resonant frequency of the electromagnetic cavity 20.

In use, a structural inspector may carry the interrogator 16 to various locations in or on the structure 14 where the sensors 18 are located. The structural inspector would then point the interrogator 16 towards the sensor 18 and push a button to generate and transmit the interrogation signal 24 to the sensor 18. The interrogator 16 would then detect the resonant frequency of the sensor 18 and calculate the strain at that portion of the structure 14. The interrogator 16 could be any distance away from the sensor 18 as long as the interrogation signal 24 is strong enough to excite the electromagnetic cavity 20 and the response signal 26 is strong enough so that the interrogator 16 may determine the resonant frequency.

The electromagnetic cavity 20 of the sensor 18 can be built to handle relatively large amounts of power. Furthermore, the sensor 18 has a simple and rugged construction and is a passive embedded sensor which can be wirelessly interrogated thereby eliminating the need for a power source and any permanent electrical or optical connections that are subject to breaking, becoming dislodged or damaged by vandals. In addition, the sensors 18 work independently of one another due to the lack of electrical or optical hardwiring. Accordingly, if for some reason one of the sensors is not functioning properly it will not have any effect on the operability of any of the other sensors.

The sensor system 10 is also very portable and easy to install. Anyone on the job site may install the sensors 18 during the time of construction of the structure 14. The sensors 18 would be placed at structural locations where maximum strains are experienced. The sensors 18 may be embedded in a concrete structure 14 while the concrete is still wet. For instance, the sensor 18 may be covered by approximately 10 cm of concrete. Alternatively, the sensors 18 may be attached to the reinforcing bars of the structure 14. The embedded sensors 18 also do not jeopardize the soundness of the structure 14.

The sensors 18 may also be attached to steel and wooden structures after the structures have been completed. In this case, the right type of adhesive is needed so that the strain experienced by the structure 14 is coupled/transferred to the sensor 18. For example, the sensor 18 may be attached to a steel structure by drilling a hole in the structure and bolting the sensor 18 to the structure.

There are a variety of uses for the sensor system 10 of the present invention. For instance, the sensor system 10 could be used for dynamic testing of the structure 14 in response to a test strain. This would allow standardized testing of structural health in response to known strains, and would also be useful in the design phase of such structures.

Alternatively, the sensor system 10 could be used to assess damage in civil structures. For instance, after the occurrence of a natural disaster such as an earthquake, the sensor system 10 may be used to determine the change in strain experienced by the structure to determine whether it is safe for emergency personnel to enter the structure. The changes in strain may be measured over time to determine whether the structure will fail and how long it would take for this failure to occur.

This invention may also be used to evaluate the performance and health of civil structures. For example, as a bridge is constructed several of the metal boxes would be embedded at strategic sites. When construction of the bridge was complete each of these sensors would be interrogated to determine if the bridge meets its specifications and to establish a baseline reading. After this baseline was established the embedded sensors would be periodically interrogated to determine the health or level of deterioration of the structure.

Although the examples and embodiments described above illustrate that the body of the sensor 18 has an electromagnetic cavity 20, it should be understood by those skilled in the art that the sensor 18 has a body that is capable of supporting resonant electromagnetic modes. Furthermore, the electromagnetic cavity 20 may be considered, in general, to be an electromagnetic resonator that resonates at a frequency related to the dimensions of the electromagnetic resonator. For instance, the electromagnetic resonator may also be a dielectric body within an insulating material to form a dielectric resonator. In this case the coupler 20 would not require the wire 40.

Furthermore, it should be understood that various modifications can be made to the preferred embodiments described and illustrated herein, without departing from the present invention, the scope of which is defined in the appended claims. For instance, a similar sensor system may be developed to monitor the structural integrity of vehicles. In this case, the frequency range would likely need to be increased to produce smaller sensors.

The invention claimed is:

1. A system for measuring strain experienced by a structure, said system comprising:
  a) a sensor including:
    i) a body having an electromagnetic cavity, said electromagnetic cavity adapted to produce a response signal in response to an interrogation signal, the interrogation signal wirelessly received by the sensor, said body being coupled to said structure to allow said strain to alter the resonance properties of said electromagnetic cavity thereby altering said response signal; and,
    ii) a coupler coupled to said body, said coupler adapted to transfer said interrogation signal into said electromagnetic cavity and transfer said response signal out of said electromagnetic cavity; and,
  b) an interrogator being adapted to generate and wirelessly transmit said interrogation signal to said sensor, said interrogator being further adapted to wirelessly receive said response signal, the interrogator having an antenna for transmitting said interrogation signal and receiving said response signal, and a signal generator coupled to said antenna, said signal generator being adapted to generate said interrogation signal.

2. The system of claim 1, wherein said electromagnetic cavity contains a dielectric.

3. The system of claim 1, wherein said body is a dielectric body.

4. The system of claim 1, wherein said electromagnetic cavity is rectangular.

5. The system of claim 1, wherein said electromagnetic cavity is cubic.

6. The system of claim 1, wherein said electromagnetic cavity is cylindrical.

7. The system of claim 1, wherein said sensor further comprises a mechanical amplifier coupled to said electromagnetic cavity, said mechanical amplifier being adapted to amplify the magnitude of said strain on said electromagnetic cavity.

8. The system of claim 7, wherein said mechanical amplifier comprises a first member having a first region with a first length and a second member having a second region with a second length, said second region being coupled to said first region, wherein said first region is exposed to said strain and said second region is coupled to said electromagnetic cavity, wherein the magnitude of said strain experienced by said electromagnetic cavity is amplified by a factor equal to the ratio of said second length to said first length.

9. The system of claim 1, wherein said interrogator further comprises a detection module coupled to said antenna, said detection module being adapted to process said response signal to determine a value indicative of said strain.

10. The system of claim 9, wherein said interrogator further comprises:
   a) an output module coupled to said control module, said output module being adapted to provide an output indicative of said strain; and,
   b) a control module coupled to said signal generator, said detection module and said output module for controlling the operation thereof.

11. The system of claim 10, wherein said interrogator further comprises:
   a) a memory module in communication with said signal generator, said detection module and said control module, said memory module being adapted to store information related to previously determined strains; and,
   b) an input module in communication with said control module, said input module being adapted to allow a user to operate said interrogator.

12. The system of claim 9, wherein said interrogation signal is a continuous narrowband signal having a center frequency that is varied in a sweep range that includes a resonant frequency of said electromagnetic cavity and said detection module is adapted to detect a minimum in said response signal at a frequency within said sweep range, wherein said minimum occurs at said resonant frequency.

13. The system of claim 9, wherein said interrogation signal is a broadband signal having a frequency content that includes a resonant frequency of said electromagnetic cavity, and said detection module is adapted to detect a minimum in said response signal wherein said minimum occurs at said resonant frequency.

14. The system of claim 9, wherein said interrogation signal is a modulated narrowband signal having a center frequency that is varied in a sweep range that includes a resonant frequency of said electromagnetic cavity and said detection module is adapted to detect a peak in said response signal at a frequency within said sweep range, wherein said peak occurs at said resonant frequency.

15. The system of claim 9, wherein said interrogation signal is a modulated broadband signal having a frequency content that includes a resonant frequency of said electromagnetic cavity, and said detection module is adapted to detect a peak in said response signal wherein said peak occurs at said resonant frequency.

16. A sensor for measuring strain experienced by a structure, said sensor comprising:
   a) a body having an electromagnetic cavity for producing a response signal in response to an interrogation signal, the interrogation signal wirelessly received by the sensor, said body being coupled to said structure to allow said strain to alter the resonance properties of said electromagnetic cavity thereby altering said response signal, the electromagnetic cavity contains a dielectric; and
   b) a coupler coupled to said sensor, said coupler adapted to transfer said interrogation signal into said electromagnetic cavity and transfer said response signal out of said electromagnetic cavity so that the response signal can be wirelessly received by an interrogator.

17. The sensor of claim 16, wherein said body is a dielectric body.

18. The sensor of claim 16, wherein said electromagnetic cavity is rectangular.

19. The sensor of claim 16, wherein said electromagnetic cavity is cubic.

20. The sensor of claim 16, wherein said electromagnetic cavity is a cylindrical cavity.

21. A method for measuring strain experienced by a structure, said method comprising:
   a) coupling a sensor to the structure, the sensor having an electromagnetic cavity;
   b) transferring through a coupler an interrogation signal into said electromagnetic cavity to evoke a response signal, the interrogation signal wirelessly received by the sensor, the interrogation signal provided as a continuous narrowband signal and the center frequency of said narrowband signal is swept in a sweep range that includes a resonant frequency of said electromagnetic cavity; and,
   c) transferring through the same or a different coupler said response signal out of said electromagnetic cavity, so that the response signal can be wirelessly received by an interrogator.

22. The method of claim 21, wherein said method further comprises processing said response signal to determine said strain.

23. The method of claim 21, said method further comprising:
   d) amplifying said strain in a mechanical fashion to amplify the magnitude of said strain experienced by said electromagnetic cavity.

24. The method of claim 21, wherein step c) comprises processing said response signal to detect a minimum at a frequency within said sweep range indicative of the resonant frequency of said electromagnetic cavity.

25. A sensor for measuring strain experienced by a structure, said sensor comprising:
   a) a body having an electromagnetic cavity for producing a response signal in response to an interrogation signal, the interrogation signal wirelessly received by the sensor, said body being coupled to said structure to allow said strain to alter the resonance properties of said electromagnetic cavity thereby altering said response signal;
   b) a coupler coupled to said sensor, said coupler adapted to transfer said interrogation signal into said electromagnetic cavity and transfer said response signal out of said electromagnetic cavity so that the response signal can be wirelessly received by an interrogator; and
   c) a mechanical amplifier coupled to said electromagnetic cavity, said mechanical amplifier being adapted to amplify the magnitude of said strain on said electromagnetic cavity, the mechanical amplifier comprises a first member having a first region with a first length and a second member having a second region with a second length, said second region being coupled to said first region, said first region is exposed to said strain and said second region is coupled to said electromagnetic cavity, and the magnitude of said strain experienced by said electromagnetic cavity is amplified by a factor equal to the ratio of said second length to said first length.

26. A method for measuring strain experienced by a structure, said method comprising:
   a) coupling a sensor to the structure, the sensor having an electromagnetic cavity;
   b) transferring through a coupler an interrogation signal into said electromagnetic cavity to evoke a response signal, the interrogation signal wirelessly received by the sensor, the response signal is provided as a continuous broadband signal having a frequency content that includes a resonant frequency of said electromagnetic cavity; and c) transferring through the same or a different coupler said response signal out of said electromagnetic cavity, so that the response signal can be wirelessly received by an interrogator.

27. A method for measuring strain experienced by a structure, said method comprising:
   a) coupling a sensor to the structure, the sensor having an electromagnetic cavity;
   b) transferring through a coupler an interrogation signal into said electromagnetic cavity to evoke a response signal, the interrogation signal wirelessly received by the sensor, the interrogation signal is modulated to provide an intermittent narrowband signal, and the frequency of said intermittent narrowband signal is swept in a sweep range that includes a resonant frequency of said electromagnetic cavity; and
   c) transferring through the same or a different coupler said response signal out of said electromagnetic cavity, so that the response signal can be wirelessly received by an interrogator.

28. A method for measuring strain experienced by a structure, said method comprising:
   a) coupling a sensor to the structure, the sensor having an electromagnetic cavity;
   b) transferring through a coupler an interrogation signal into said electromagnetic cavity to evoke a response signal, the interrogation signal wirelessly received by the sensor, the interrogation signal is modulated to provide an intermittent broadband signal having a frequency content that includes a resonant frequency of said electromagnetic cavity; and
   c) transferring through the same or a different coupler said response signal out of said electromagnetic cavity, so that the response signal can be wirelessly received by an interrogator.

29. The method of claim 26, wherein step c) comprises processing said response signal to detect a notch at a frequency indicative of the resonant frequency of said electromagnetic cavity.

30. The method of claim 27, wherein step c) comprises processing said response signal to detect a peak at a frequency within said sweep range indicative of the resonant frequency of said electromagnetic cavity.

31. The method of claim 28, wherein step c) comprises processing said response signal to detect a peak at a frequency indicative of the resonant frequency of said electromagnetic cavity.

* * * * *